US010865681B2

(12) United States Patent
Buechler et al.

(10) Patent No.: US 10,865,681 B2
(45) Date of Patent: Dec. 15, 2020

(54) SUBSTRATE SHAPE, GEOMETRY, POSITIONING, AND/OR CELL DENSITY TO IMPROVE AFTERTREATMENT PERFORMANCE

(71) Applicant: CUMMINS EMISSION SOLUTIONS INC., Columbus, IN (US)

(72) Inventors: John G. Buechler, Indianapolis, IN (US); Randolph G. Zoran, McFarland, WI (US); Ryan M. Johnson, Cottage Grove, WI (US); Stephen M. Holl, Columbus, IN (US); Taren DeHart, Columbus, IN (US); Jim L. Alonzo, Verona, WI (US); Matthew L. Anderson, Columbus, IN (US); Apoorv Kalyankar, Madison, WI (US); George Eugene Mavroudis, Oregon, WI (US); Gaurav Hemant Pandit, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/781,433

(22) PCT Filed: Oct. 20, 2017

(86) PCT No.: PCT/US2017/057665
§ 371 (c)(1),
(2) Date: Jun. 4, 2018

(87) PCT Pub. No.: WO2018/075931
PCT Pub. Date: Apr. 26, 2018

(65) Prior Publication Data
US 2019/0234270 A1 Aug. 1, 2019

Related U.S. Application Data

(60) Provisional application No. 62/411,292, filed on Oct. 21, 2016, provisional application No. 62/411,312, (Continued)

(51) Int. Cl.
*F01N 3/022* (2006.01)
*F01N 3/20* (2006.01)
(Continued)

(52) U.S. Cl.
CPC ............ *F01N 3/208* (2013.01); *F01N 3/022* (2013.01); *F01N 3/0215* (2013.01);
(Continued)

(58) Field of Classification Search
CPC . B01D 53/9418; B01D 53/944; F01N 3/0215; F01N 3/022; F01N 3/2066;
(Continued)

(56) References Cited

U.S. PATENT DOCUMENTS 3,251,403 A * 5/1966 Smith ............... F28F 21/04
165/10
4,668,659 A * 5/1987 Engels ............... B01J 35/04
423/213.5
(Continued)

OTHER PUBLICATIONS

International Search Report from corresponding published PCT Application No. WO 2018/075931, dated Mar. 5, 2018, pp. 1-3.
(Continued)

*Primary Examiner* — Frank M Lawrence, Jr.
(74) *Attorney, Agent, or Firm* — Foley & Lardner LLP

(57) ABSTRACT

An aftertreatment component's shape, entrance geometry, and/or position within an aftertreatment assembly can be modified for local and/or bulk exhaust flow control. In some implementations, a body of the aftertreatment component has a non-circular cross-section, a non-circular opening,
(Continued)

and/or a variable face geometry. The non-circular cross-section and/or opening can be of a variety of different shapes.

11 Claims, 13 Drawing Sheets

Related U.S. Application Data filed on Oct. 21, 2016, provisional application No. 62/411,351, filed on Oct. 21, 2016.

(51) Int. Cl.
*F01N 3/28* (2006.01)
*F01N 3/021* (2006.01)
*B01D 53/94* (2006.01)

(52) U.S. Cl.
CPC ......... *F01N 3/2066* (2013.01); *F01N 3/2803* (2013.01); *F01N 3/2882* (2013.01); *B01D 53/944* (2013.01); *B01D 53/9418* (2013.01); *F01N 2330/30* (2013.01); *F01N 2330/60* (2013.01); *Y02T 10/12* (2013.01)

(58) Field of Classification Search
CPC ...... F01N 3/208; F01N 3/2803; F01N 3/2882; F01N 2330/30; F01N 2330/60; Y02T 10/20
USPC ........... 55/385.3, 520, 529; 96/154; 60/311; 422/177, 180, 181
See application file for complete search history.

(56) References Cited

U.S. PATENT DOCUMENTS

| | | | | |
|---|---|---|---|---|
| 5,575,980 | A * | 11/1996 | Turek | F01N 3/2814 422/181 |
| 5,809,776 | A * | 9/1998 | Holtermann | B01D 53/9454 422/181 |
| 5,824,232 | A * | 10/1998 | Asher | B01D 29/21 210/787 |
| 5,902,558 | A * | 5/1999 | Maus | B01J 35/04 422/176 |
| 7,252,809 | B2 * | 8/2007 | Bruck | F01N 3/2006 422/180 |
| 7,491,373 | B2 | 2/2009 | Ketcham et al. | |
| 8,635,861 | B2 | 1/2014 | Sun et al. | |
| 8,691,724 | B2 | 4/2014 | Simon et al. | |
| 2008/0093163 | A1 | 4/2008 | Frederiksen | |
| 2009/0007551 | A1 | 1/2009 | Wahlstrom et al. | |
| 2011/0041469 | A1 * | 2/2011 | Fischer | B01D 46/2411 55/498 |

OTHER PUBLICATIONS

Written Opinion from corresponding published PCT Application No. WO 2018/075931, dated Mar. 5, 2018, pp. 1-4.

* cited by examiner

Uniform flow into substrate due to catalyst shape / position within AT assembly

• Non Concentric Center hole
• Non Round

SUBSTRATE SHAPE, GEOMETRY, POSITIONING, AND/OR CELL DENSITY TO IMPROVE AFTERTREATMENT PERFORMANCE

CROSS REFERENCE TO RELATED APPLICATIONS

The present application is the U.S. national stage application of PCT Application No. PCT/US2017/057665, filed Oct. 20, 2017, which claims the benefit of priority to U.S. Provisional Application No. 62/411,292, filed Oct. 21, 2016, to U.S. Provisional Application No. 62/411,351, filed Oct. 21, 2016, and to U.S. Provisional Application No. 62/411,312, filed Oct. 21, 2016, the contents of all of which are incorporated herein by reference in their entirety.

TECHNICAL FIELD

The present application relates generally to the field of aftertreatment systems for use with internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to aftertreatment component shape, aftertreatment component entrance geometry, and the position of the aftertreatment component within the aftertreatment assembly for local and bulk exhaust flow control.

In a first set of implementations, an aftertreatment component comprises a body having a plurality of channels formed therethrough, wherein the body has a non-circular cross-section. In particular embodiments, the non-circular cross-section may be one of an oval, a square, a rectangle, an egg-shape, a pentagon, a hexagon, a heptagon, an octagon, or a star-shape.

In a second set of implementations, an aftertreatment component comprises a body having a plurality of channels formed therethrough, wherein the body has a non-circular inlet opening. In particular embodiments, the non-circular inlet opening may be one of an oval, a square, a rectangle, an egg-shape, a pentagon, a hexagon, a heptagon, an octagon, or a star-shape.

In a third set of implementations, an aftertreatment component comprises a body having a plurality of channels formed therethrough, wherein the body has a variable face. In particular embodiments, the variable face may be one of circular, oblong, toroidal, angled, curved, domed, convex or concave, pyramidal, conical, sinusoidal.

In a further implementation, a radial aftertreatment component can include a body having a radial exterior and a radial interior. The body includes a channel formed therethrough from the radial exterior to the radial interior. The channel includes a channel geometry of one or more of a curved shape, an S-shape, a zig-zag shape, a turbo shape, a tangential shape, an angled shape, a helical shape, or a non-uniform shape.

In still a further implementation, an aftertreatment device can include a body and several channels formed in the body. A first channel has a first effective channel size and a second channel has a second effective channel size.

BRIEF DESCRIPTION

The details of one or more implementations are set forth in the accompanying drawings and the description below. Other features, aspects, and advantages of the disclosure will become apparent from the description, the drawings, and the claims, in which:

FIG. 18 is a schematic diagram showing a cross-sectional view of a radial catalyst having multiple intersection channels from a radial exterior to a radial interior for exhaust gas to flow through;

Figure 1:
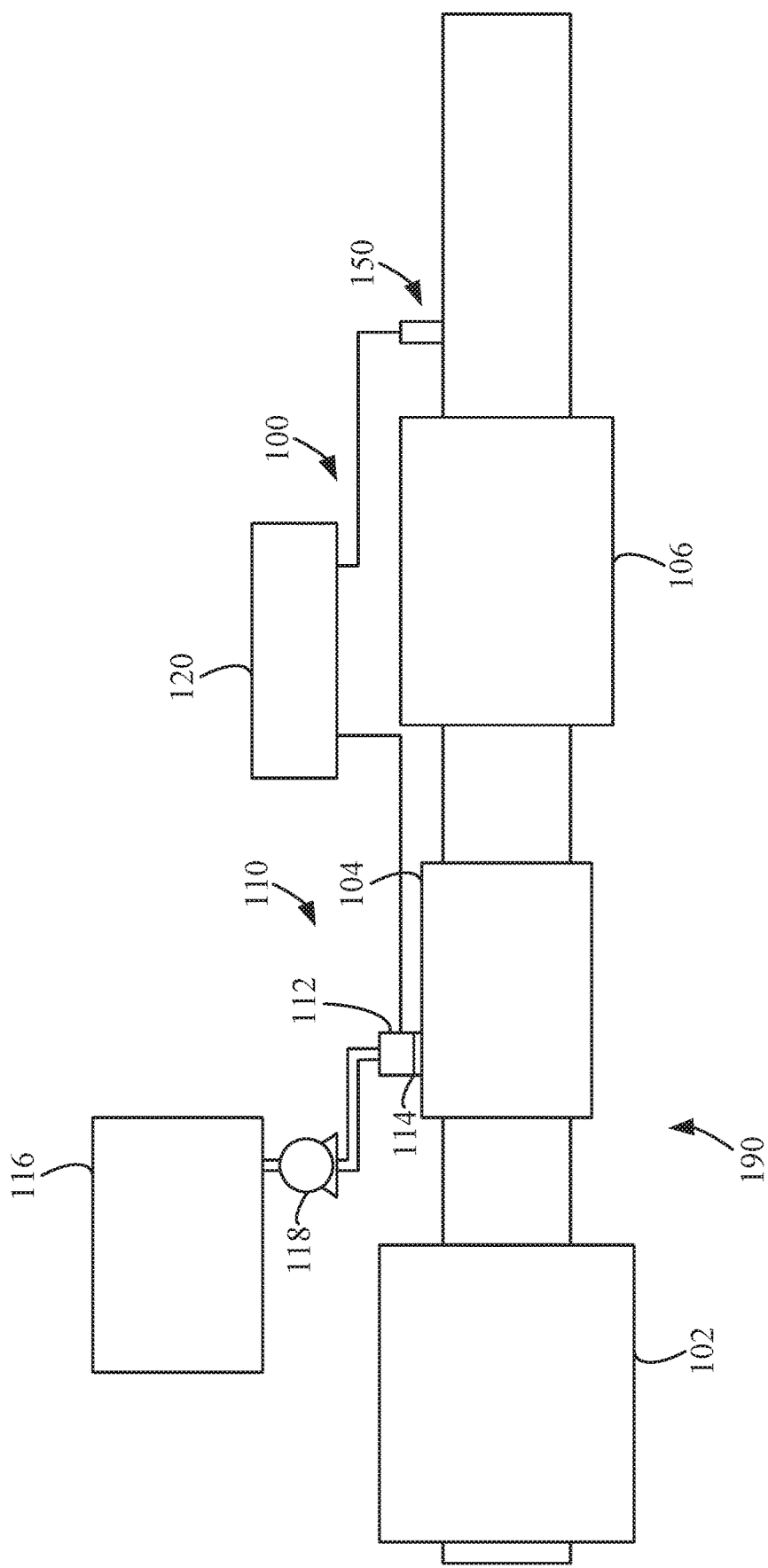
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for aftertreatment component shape, aftertreatment component entrance geometry, and the position of the aftertreatment component within the aftertreatment assembly for local and bulk exhaust flow control. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In aftertreatment systems, exhaust flow into one or more aftertreatment devices, such as catalysts, filters, etc., can affect the performance of the aftertreatment device and/or the aftertreatment system (e.g., backpressure, etc.). Controlling exhaust gas flow into, out of, and through aftertreatment devices can improve performance of the aftertreatment devices, engine performance, etc. The aftertreatment devices can be axial, radial, and/or multi-axial for the flow of exhaust gas through the aftertreatment devices.

In some aftertreatment systems, an axial catalyst or filter may be implemented for having exhaust gas flow axially through the catalyst or filter. In other aftertreatment systems, a radial catalyst or filter may be implemented to reduce a length of the aftertreatment system and/or to fit the aftertreatment system into a predefined area. In still further aftertreatment systems, a multi-axial catalyst or filter may be implemented.

Aftertreatment component related features such as shape, entrance geometry, and position within the aftertreatment assembly can affect local and bulk exhaust flow entering into and/or flowing through the aftertreatment component such that uniform flow and minimal backpressure can be achieved without extra flow straightening devices. Rather, only changing aftertreatment component-related features such as shape, entrance geometry, and the position of the within the aftertreatment assembly can be modified to control exhaust gas flow into, through, and/or out of the aftertreatment component.

For instance, offsetting the substrate of a catalyst or a filter within the aftertreatment package or changing the shape of the substrate of a catalyst or a filter can improve aftertreatment flow performance, including uniformity and backpressure. Changing the offset may allow certain channels formed in the substrate of a catalyst or a filter to be closer to the flow entrance than other channels, thus helping to drive uniform flow.

In addition, changing the shape appropriately may drive similar improvement in flow uniformity. Aftertreatment device shapes could be circular, oblong, toroidal, angled, curved, domed, convex or concave, pyramidal, conical, or a unique shape contoured in relation to the aftertreatment package to drive uniform flow. In a radial catalyst (e.g., having a central inlet or outlet and an exterior surface inlet or outlet, such as a toroidal package), where the air inlet is tangential to the substrate, the substrate for the catalyst or filter may be mounted in a non-center location as well as potentially being non-round or a customized shape in order to use the different air gap around the aftertreatment component to manage the air flow of the aftertreatment component in an effort to drive uniform flow at different air flow rates and operating conditions.

For radial aftertreatment components, flow uniformity can be achieved by offsetting the entrance of the radial substrate away from t center. The offset may allow certain channels to be closer to the flow entrance than other channels in the substrate thus helping to drive uniform flow. In addition to a non-centered entrance, the entrance could also be non-round to help drive the desired uniform flow field. Additionally the center hole could change relative locations axially throughout the aftertreatment component with one end in the center and the other end biased to one side of the aftertreatment component.

In further implementations, an increase to a surface area and/or open frontal area seen by the flow entering the aftertreatment component may also improve performance. The internal inlet shape of a radial aftertreatment component is typically round in nature. Rather than round or cylindrical, the inlet shape can be of such a pattern that substantially increases the open frontal area and/or surface area seen by the inlet flow while minimizing the decrease in substrate volume. The increased open frontal area at the substrate entrance can provide significant benefits in preventing blockage of the inlet area as well as provide lower backpressure.

Impacting the exhaust gas flow with no upstream or other external to the catalyst or filter flow devices may eliminate components from the aftertreatment system and thus improve space and cost. In addition, having the flow to uniformly enter a catalyst will result in catalyst efficiency benefits such as improved NOR, ammonia, hydrocarbon conversion and thus, less catalyst volume, again improving aftertreatment size and cost. Similarly, having the flow to uniformly enter a filter will result in filter efficiency benefits such as uniform ash, soot or other particulate matter build-up or face plugging and thus, less filter volume, again improving aftertreatment size and cost.

In some aftertreatment systems, a radial catalyst or filter may be implemented to reduce a length of the aftertreatment system and/or to fit the aftertreatment system into a predefined area. The channels formed in the radial catalyst or filter may have different patterns or geometries from a radial exterior entrance to the radial catalyst to a radial interior exit. For instance, the radial catalyst or filter may have a curved pattern curving from the radial exterior entrance to the radial interior exit. In other instances, the channels may have an S-shaped pattern from the radial exterior entrance to the radial interior exit. In further instances, the channels may have a zig-zag pattern from the radial exterior entrance to the radial interior exit. In other instances, the channels may have a wide opening at the radial exterior entrance and a narrower exit at the radial interior exit, such as a turbo type pattern. In still other instances, the channels can have a tangential path relative to a curvature of the radial interior of the radial catalyst. In still further implementations, angled or helical channels may be implemented from the radial exterior entrance to the radial interior exit. In further implementations, non-uniform channels (e.g., a combination of a straight channel and curved channel and/or any other combination channels) may be implemented from the radial exterior entrance to the radial interior exit. In still further implementations, a combination of two or more of the foregoing configurations for the radial catalyst or filter may be formed in the radial catalyst or filter. For instance, the channels of the radial catalyst or filter may have two or more of a curved pattern, an S-shaped pattern, a zig-zag pattern, a wide opening at the radial exterior entrance and a narrower exit at the radial interior exit, such as a turbo type pattern, a tangential path pattern, an angled pattern, a helical pattern, and/or a non-uniform pattern.

In any of the foregoing implementations, the radial channel paths of the radial catalyst or filter may be configured with multiple intersections for ash or other particulate matter to be dispersed within the radial catalyst or filter instead of a single exit point where excess ash or particulate matter may build up.

In some aftertreatment systems, an axial catalyst or filter may be implemented for having exhaust gas flow axially through the catalyst or filter. In other aftertreatment systems, a radial catalyst or filter may be implemented to reduce a length of the aftertreatment system and/or to fit the aftertreatment system into a predefined area. In still further aftertreatment systems, a multi-axial catalyst or filter may be implemented. For any of the foregoing catalysts or filters, the channels are formed in a substrate for the catalyst or filter. In some implementations, the channels have a uniform or substantially uniform cross-sectional effective channel size or cells per square inch (CPSI). The effective channel size may be, for example, a cross-sectional area of a channel or a volume of the channel. Such uniform or substantially uniform CPSI may be useful when a uniform flow is entering the aftertreatment component. However, if the flow entering the aftertreatment component is not uniform, then some channels may have more exhaust gas flowing through them than others. This can lead to increased $NO_x$ and/or $NH_3$ slip, decreased catalytic performance, increased filter plugging, etc. Accordingly, varying or modifying the cross-sectional effective channel size or CPSI of a catalyst or filter may control the flow of exhaust gases through the aftertreatment component by promoting increased flow where the incoming flow is low by having a larger cross-sectional effective channel size and/or lower CPSI and decreased flow where the incoming flow is high by having a smaller cross-sectional effective channel size and/or higher CPSI.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104 or reactor pipe. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Example Variable Configurations for Catalysts and Filters

To improve performance of an aftertreatment system, such as flow distribution (e.g., Flow Distribution Index (FDI)), uniformity, catalytic performance, etc., aftertreatment component characteristics may be modified, such as shape, entrance features, and/or position within the aftertreatment assembly. That is, the local and bulk exhaust flow profile entering into and/or exiting from the aftertreatment component may be modified by adjustment of the shape, entrance, and/or position of the aftertreatment component such that uniform flow and minimal backpressure can be achieved without adding upstream or extra flow straightening devices.

For instance, offsetting a substrate of a catalyst or filter within the aftertreatment package or changing the shape of the substrate of the catalyst or filter can improve aftertreatment flow performance, including uniformity and backpressure. Changing the offset can allow certain channels formed in the substrate of the catalyst or filter to be closer to the flow entrance than other channels, thus helping to drive uniform flow.

Similarly, changing the substrate shape of the catalyst or filter appropriately would drive similar improvement in flow uniformity. Aftertreatment device shapes could be circular, oblong, toroidal, angled, curved, domed, convex or concave, pyramidal, conical, or a unique shape contoured in relation to the aftertreatment package to drive uniform flow. In a radial catalyst (e.g., having a central inlet or outlet and an exterior surface inlet or outlet, such as a toroidal package), where the air inlet is tangential to the substrate, the substrate for the catalyst or filter may be mounted in a non-center location as well as potentially being non-round or a customized shape in order to use the different air gap around the aftertreatment component to manage the air flow of the aftertreatment component in an effort to drive uniform flow at different air flow rates and operating conditions.

For radial aftertreatment components, flow uniformity can be achieved by offsetting the entrance of the radial substrate away from t center. The offset may allow certain channels to be closer to the flow entrance than other channels in the substrate thus helping to drive uniform flow. In addition to a non-centered entrance, the entrance could also be non-round to help drive the desired uniform flow field. Additionally the center hole could change relative locations axially throughout the aftertreatment component with one end in the center and the other end biased to one side of the aftertreatment component.

In further implementations, an increase to a surface area and/or open frontal area seen by the flow entering the aftertreatment component may also improve performance. The internal inlet shape of a radial aftertreatment component is typically round in nature. Rather than round or cylindrical, the inlet shape can be of such a pattern that substantially increases the open frontal area and/or surface area seen by the inlet flow while minimizing the decrease in substrate volume. The increased open frontal area at the substrate entrance can provide significant benefits in preventing blockage of the inlet area as well as provide lower backpressure.

Impacting the exhaust gas flow with no upstream or other external to the catalyst or filter flow devices may eliminate components from the aftertreatment system and thus improve space and cost. In addition, having the flow to uniformly enter a catalyst will result in catalyst efficiency benefits such as improved NOR, ammonia, hydrocarbon conversion and thus, less catalyst volume, again improving aftertreatment size and cost. Similarly, having the flow to uniformly enter a filter will result in filter efficiency benefits such as uniform ash, soot or other particulate matter build-up or face plugging and thus, less filter volume, again improving aftertreatment size and cost.

Figure 2:
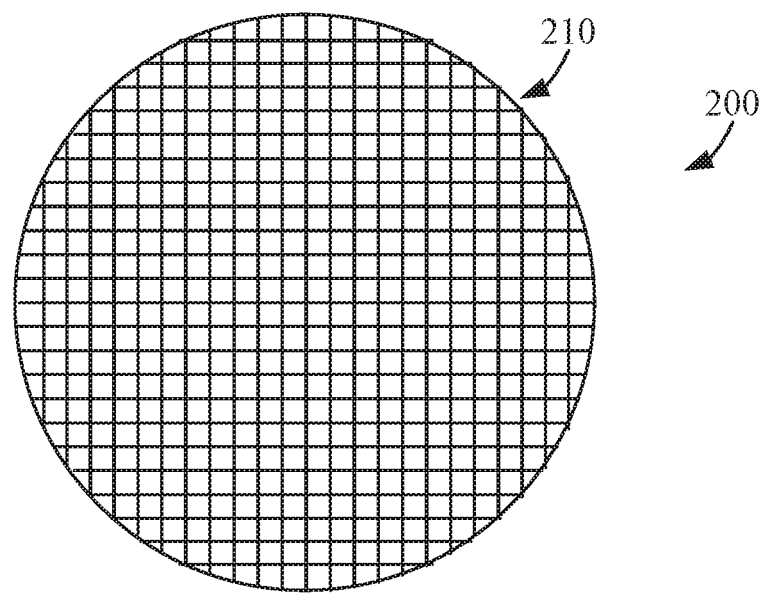
FIG. 2 is a front cross-sectional diagram of an example aftertreatment component having a substantially circular shape for an axial or longitudinal aftertreatment component.

FIG. 2 depicts an example catalyst or filter 200 having a body with a plurality of channels 210 formed therethrough. In the example shown, the catalyst or filter 200 is an axial catalyst or filter 200 having a circular cross-section, though other geometries of the catalyst or filter 200 and/or the cross-section may be implemented (e.g., square, rectangular, ovular, egg-shaped, etc.). The exhaust gas flows into an upstream face of the catalyst or filter 200, into a plurality of channels 210, and out a downstream face of the catalyst or filter 200.

Figure 3:
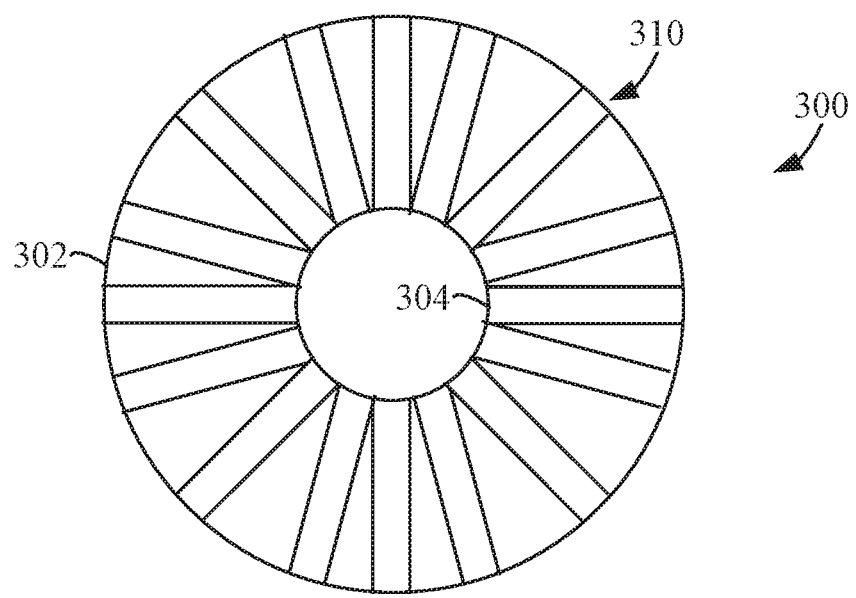
FIG. 3 is a top cross-sectional view diagram of a radial aftertreatment component having a substantially circular shape and a central axial opening.

FIG. 3 depicts an example radial catalyst or filter 300 having a body with a plurality of channels 310 formed therethrough. The radial catalyst or filter 300 has a radial exterior 302 and a radial interior 304 with the plurality of channels 310 extending from the radial exterior 302 to the radial interior 304. In the example shown, the catalyst or filter 300 is a radial catalyst or filter 300 having a circular cross-section, though other geometries of the catalyst or filter 300 and/or the cross-section may be implemented (e.g., square, rectangular, ovular, egg-shaped, etc.). In some implementations, the exhaust gas flows into the radial exterior 302 of the catalyst or filter 300, into the channels 310, and out the radial interior 304 of the catalyst or filter 300. In other implementations, the exhaust gas flows into the radial interior 304 of the catalyst or filter 300, into the channels 310, and out the radial exterior 302 of the catalyst or filter 300.

Figure 4:
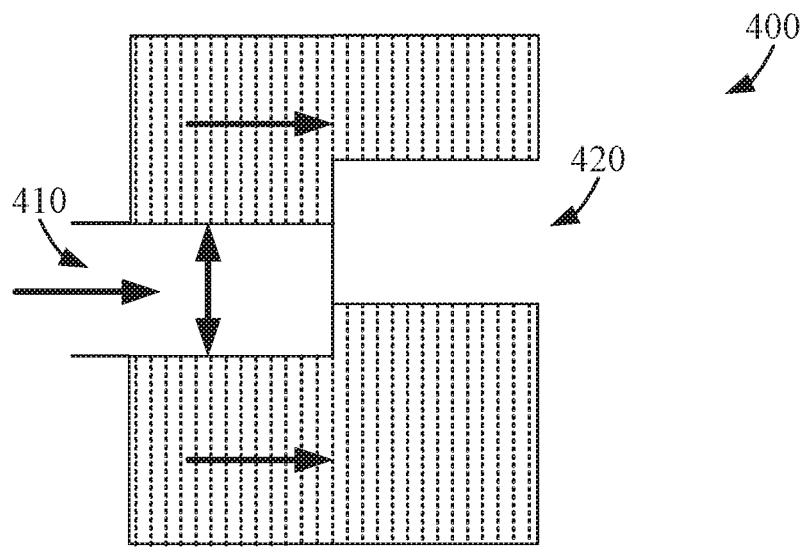
FIG. 4 is a top cross-sectional diagram of an example aftertreatment component having an offset internal axial opening.

FIG. 4 depicts an aftertreatment component 400 includes a body having an upstream axial opening 410 and an offset internal axial opening 420. The offset internal axial opening may be arranged to account for an upstream exhaust gas flow profile indicating that more exhaust gas flows toward the lower portion of the aftertreatment component 400 than the upper portion of the aftertreatment component 400. Thus, the increased substrate size of the lower portion may process the additional exhaust gas flow through the increased size while the substrate size of the upper portion processes the lesser exhaust gas flow.

Figure 5:
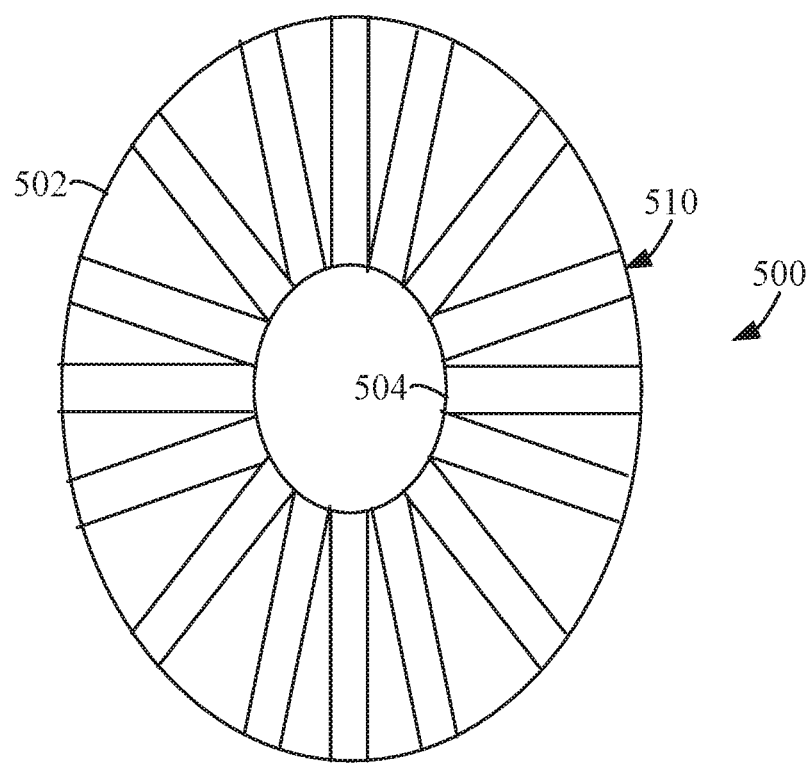
FIG. 5 is a top cross-sectional diagram of an example aftertreatment component having an ovular or oblong shape.

FIG. 5 depicts an aftertreatment component 500 having a body with a plurality of channels 510 formed therethrough. The radial catalyst or filter 500 has a radial exterior 502 and a radial interior 504 with the plurality of channels 510 extending from the radial exterior 502 to the radial interior 504. In the example shown, the catalyst or filter 500 has an ovular or oblong cross-section, though other geometries of the catalyst or filter 500 and/or the cross-section may be implemented (e.g., square, rectangular, egg-shaped, pentagonal, hexagonal, heptagonal, octagonal, star-shaped, etc.). The shape of the aftertreatment component 500 can affect the exhaust gas flow into and/or out of the aftertreatment component 500. In some implementations, the exhaust gas flows into the radial exterior 502 of the catalyst or filter 500, into the channels 510, and out the radial interior 504 of the catalyst or filter 500. In other implementations, the exhaust gas flows into the radial interior 504 of the catalyst or filter 500, into the channels 510, and out the radial exterior 502 of the catalyst or filter 500.

Figure 6:
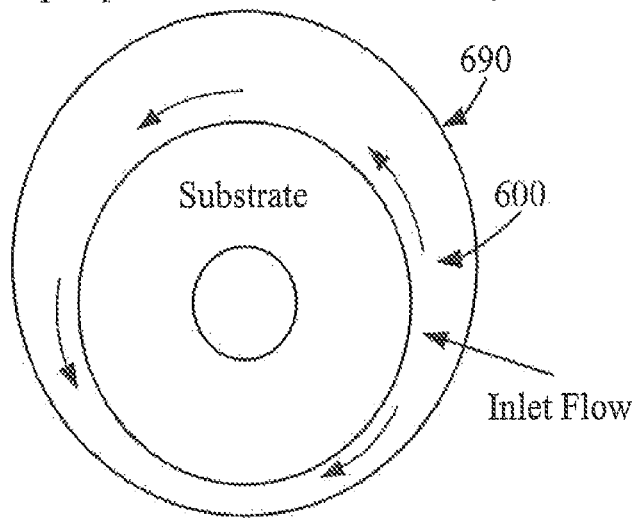
FIG. 6 is a top view of an example radial aftertreatment component offset within an exhaust casing of an aftertreatment system.

FIG. 6 depicts a radial aftertreatment component 600 having a body with a plurality of channels formed therethrough and offset within an exhaust casing 690 of an aftertreatment system. In the implementation shown, the aftertreatment component 600 is offset from an axis of the exhaust casing 690 based on the incoming exhaust gas flow profile. That is, the position of the aftertreatment component 600 relative to the axis of the exhaust casing 690 and/or a center point of the exhaust casing 690 may be modified based on the incoming exhaust gas flow profile such that uniform or substantially uniform flow of exhaust gas occurs through the aftertreatment component 600. In the example shown, the additional or lesser volume of space between the aftertreatment component 600 and the exhaust casing 690 may affect the velocity, density and/or other characteristics of the exhaust gas flow into and/or out of the aftertreatment component 600.

Figure 7:
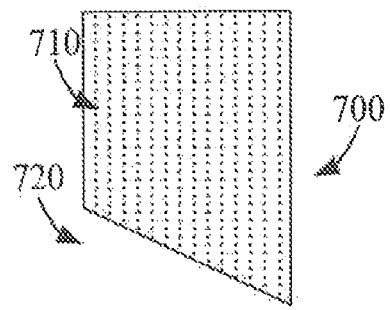
FIG. 7 is a top cross-sectional view of an axial or longitudinal aftertreatment component having a variable upstream face.

FIG. 7 depicts an axial or longitudinal aftertreatment component 700 having a body with a plurality of channels 710 formed therethrough and including a variable upstream face 720. The variable upstream face 720 is configured based on an upstream or incoming exhaust gas flow profile. In the implementation shown, an angled upstream face 720 is provided for an upstream exhaust gas flow having an increased velocity or density at one end and decreasing at the other end. For other exhaust gas flow profiles, the variable upstream face 720 may have other configurations, such as circular, oblong, toroidal, angled, curved, domed, convex or concave, pyramidal, conical, sinusoidal, or any other shape or curvature. In some implementations, the variable upstream face 720 may implemented on the downstream outlet face for affecting the downstream exhaust gas flow profile exiting the aftertreatment component 700.

Figure 8:
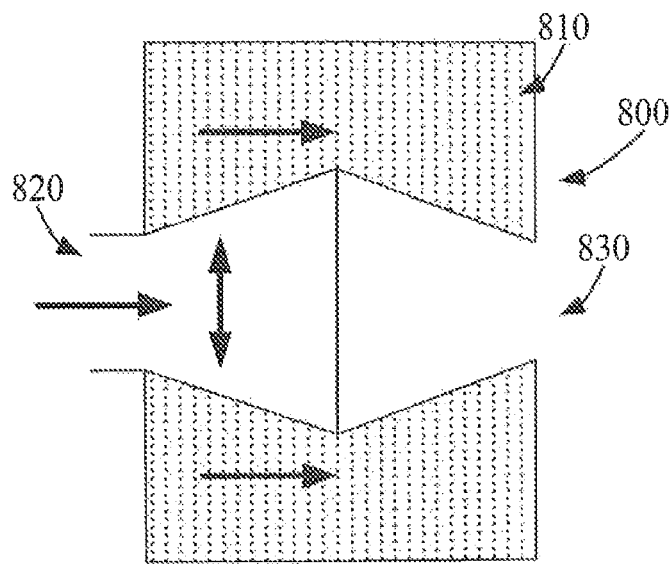
FIG. 8 is a top cross-sectional view of an aftertreatment component having a variable inlet and outlet opening.

FIG. 8 depicts an aftertreatment component 800 having a body with a plurality of channels 810 formed therein and having a variable inlet opening 820 and variable outlet opening 830. The variable inlet opening 820 and/or variable outlet opening 830 can have any geometric configuration, such as semi-conical, ovular, pyramidal, sinusoidal, or any other shape or curvature to affect the exhaust gas flow into and/or out of the channels 810. In the implementation shown, the variable inlet opening 820 is semi-conical and expands as exhaust gas flows into the variable inlet opening 820. The variable outlet opening 830 is also semi-conical and contracts as exhaust gas flows out of the variable outlet opening 830. The shape of the variable inlet opening 820 can be based on the incoming exhaust gas flow profile. Similarly, the shape of the variable outlet opening 830 can be based on the incoming exhaust gas flow profile.

Figure 9:
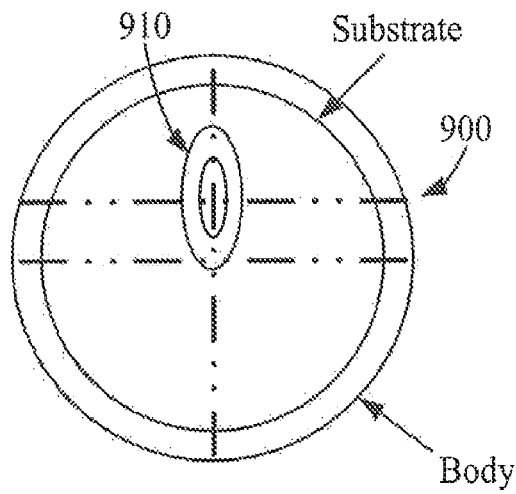
FIG. 9 is a top view of another aftertreatment component having a variable inlet and/or outlet opening.

FIG. 9 depicts another aftertreatment component 900 having a body with a plurality of channels formed therein and having a variable inlet or outlet opening 910. In the implementation shown, the variable inlet or outlet opening 910 is ovular or oblong and is offset from an axis of the body. That is, based on the exhaust flow profile into and/or out of the aftertreatment component 900, the variable inlet or outlet opening 910 can be offset from a central axis of the aftertreatment component 900 and/or may have a variable shape, such as oblong, square, rectangular, egg-shaped, pentagonal, hexagonal, heptagonal, octagonal, star-shaped, etc. The offset variable inlet or outlet opening 910 can increase the length and/or time exhaust gas passes through the aftertreatment component 900 for portions of the aftertreatment component 900 or decrease the length and/or time exhaust gas passes through the aftertreatment component 900 for portions of the aftertreatment component 900 based on the incoming exhaust gas flow profile and/or to affect the outgoing exhaust gas flow profile.

The offset may allow certain channels to be closer to the flow entrance than other channels in the body, thus helping to drive uniform flow. In addition to a non-centered entrance, the entrance could also be non-round to help drive the desired uniform flow field. Additionally, the center opening could change relative locations axially throughout the catalyst with one end in the center and the other end biased to one side of the aftertreatment device.

Figure 10:
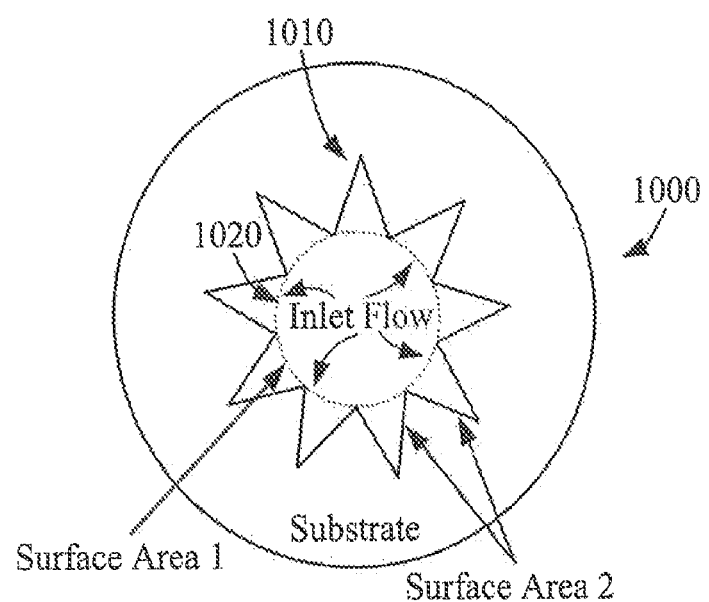
FIG. 10 is a top view of another aftertreatment component having another variable inlet opening.

FIG. 10 depicts another aftertreatment component 1000 having a body with a plurality of channels formed therein and having a variable inlet or outlet opening 1010. In the implementation shown, the variable inlet or outlet opening 1010 includes additional angular faces for increasing a surface area of the and/or frontal area to the incoming or outgoing exhaust gas as compared to a circular opening 1020. That is, based on the exhaust flow profile into and/or out of the aftertreatment component 1000, the variable inlet or outlet opening 1010 can have a variable shape, such as oblong, square, rectangular, egg-shaped, pentagonal, hexagonal, heptagonal, octagonal, star-shaped, etc. The variable inlet or outlet opening 1010 can increase the length and/or time exhaust gas passes through the aftertreatment component 1000 for portions of the aftertreatment component 1000 or decrease the length and/or time exhaust gas passes through the aftertreatment component 1000 for portions of the aftertreatment component 1000 based on the incoming exhaust gas flow profile and/or to affect the outgoing exhaust gas flow profile. In addition, the increased open frontal area at the variable inlet or outlet opening 1010 can reduce blockage of the inlet area as well as provide lower backpressure. In aftertreatment systems, faceplugging of a catalyst or filter (e.g., for a diesel oxidation catalyst, selective catalytic reduction catalyst, diesel particulate filter, etc.) with hydrocarbons and/or soot may be reduced based on the increased inlet area.

IV. Example Variable Channel Geometry

Substrate and/or filter channels of various shapes can provide benefits for aftertreatment performance. Examples of channel shapes that can provide benefits are curved channels, zig-zag channels, turbo channels, angled channels and many more. Channels can be shaped to allow alignment with incoming or upstream flow, which can result in improved flow uniformity into the channels and a lower overall backpressure. The shape of the channels can also influence how ash is distributed through the substrate and/or filter and may minimize the impact of ash accumulation on backpressure. Channel shapes can also have a positive impact on particle number (PN) that may result from the injection of reductant into aftertreatment systems. The shape of the channels can influence the local flow characteristics within the channel (laminar or turbulent flow variation) and promote improved performance, such as NOR, hydrocarbon, $NH_3$, etc. conversion, of the catalyst. The channels can also be shaped to affect outgoing or downstream flow, which can result in improved flow uniformity out of the channels into the downstream aftertreatment component and a lower overall backpressure. Such configurations can eliminate additional flow control elements by providing improved uniformity, which may result in a reduced length or spatial footprint of the radial catalyst or filter, reduce cost, and minimize backpressure penalties.

In some implementations, the channel geometry in radial catalysts and/or filters can be configured to drive ash or other particulate matter to be distributed more evenly to multiple locations than to predominantly one radial interior location. This can be achieved by configuring the channel geometry such that there are numerous "channel endings" for the ash or other particulate matter to accumulate. That is, channels can be configured to intersect and aggregate at multiple radial points within the radial catalyst or filter 200 such that ash or other particulate matter is captured at such intersections. This can effectively distribute the ash or other particulate matter across the filter or substrate volume instead of concentrating the ash or particulate matter at a single or a few radial interior locations. Such multi-tiered ash or particulate matter capture through the volume of the radial catalyst or filter 200 can result in improved backpressure (e.g., because ash or particulate matter clogging the single exit may increase backpressure rapidly as ash or particulate matter increases) as well as improved thermal robustness.

Referring generally to FIGS. 11-18, various configurations for a radial catalyst or filter are presented having different geometries and configurations for the channels of the radial catalyst or filter. Any of the following channel geometries can be combined with any of the other channel geometries described herein to result in a non-uniform channel geometry (e.g., a straight channel for a first portion with a curved second portion, a curved channel first portion with a zig-zag second portion, etc.). Moreover, any of the following channel geometries can be combined with any of the other channel geometries described herein in different portions of the radial catalyst or filter to result in a radial catalyst or filter with different sectors of channel geometries (e.g., an upper half of the radial catalyst or filter with curved channels and a lower half of the radial catalyst or filter with zig-zag channels).

Figure 11:
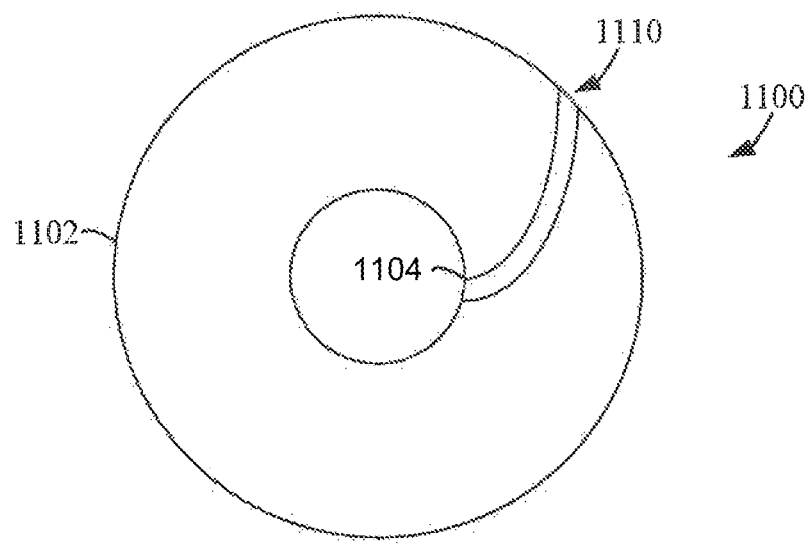
FIG. 11 is a schematic diagram showing a cross-sectional view of a radial catalyst having an example curved channel from a radial exterior to a radial interior for exhaust gas to flow.

FIG. 11 depicts a cross-sectional view of an implementation of a radial catalyst or filter 1100 with a radial exterior 1102 and radial interior 1104 for a body, such as a substrate. The radial catalyst or filter 1100 includes one or more curved channels 1110 formed through the body from the radial exterior 1102 to the radial interior 1104. In some implementations, an entrance and/or an exit of the curved channels 1110 may be perpendicular to the surface at the radial exterior 1102 and/or radial interior 1104, respectively. In some implementations, the entrance and/or the exit of the curved channels 1110 may form an angle (e.g., 0 degrees, inclusive, to 90 degrees, inclusive) relative to the surface at the radial exterior 1102 and/or radial interior 1104, respectively. In some implementations, the entrance of the curved channels 1110 may be larger and/or smaller than the exit of the curved channel 1110. In some implementations, the curved channels 1110 can include rifling (e.g., spiraled grooves) and/or guide vanes formed within the curved channel 1110. Curved channels 1110 can improve the introduction and/or exit of exhaust gas when the entry angle to the curved channels 1110 is substantially aligned with incoming flow and/or the exit angle to the curved channels 1110 is substantially aligned with a desired direction of outgoing flow. For catalyst implementations, the curved shape of the curved channels 1110 can also improve catalyst performance due to increased channel wall contact between the exhaust gas flowing through the channels 1110 and the active material of the catalyst coating the walls of the channels 1110.

Figure 12:
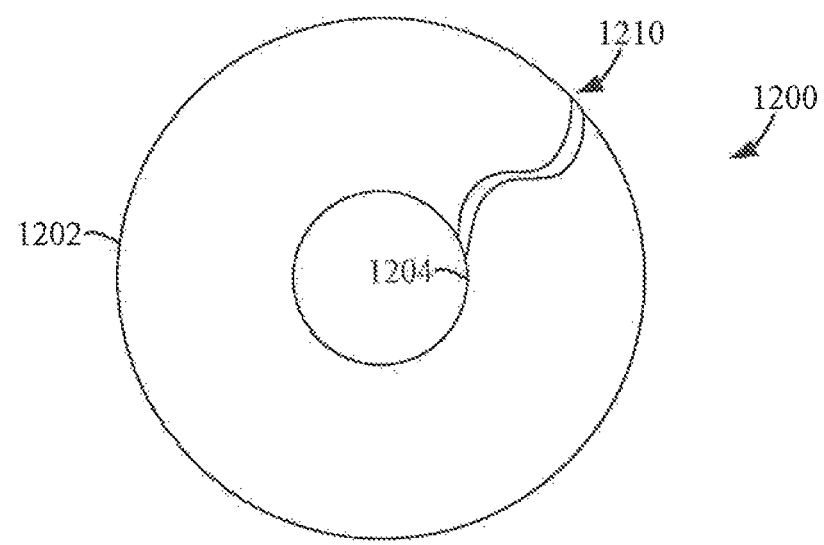
FIG. 12 is a schematic diagram showing a cross-sectional view of a radial catalyst having an example S-curved channel from a radial exterior to a radial interior for exhaust gas to flow.

FIG. 12 depicts a cross-sectional view of an implementation of a radial catalyst or filter 1200 with a radial exterior 1202 and radial interior 1204 for a body, such as a substrate. The radial catalyst or filter 1200 includes one or more S-shaped channels 1210 formed through the body from the radial exterior 1202 to the radial interior 1204. In some implementations, an entrance and/or an exit of the S-shaped channels 1210 may be perpendicular to the surface at the radial exterior 1202 and/or radial interior 1204, respectively. In some implementations, the entrance and/or the exit of the S-shaped channels 1210 may form an angle (e.g., 0 degrees, inclusive, to 90 degrees, inclusive) relative to the surface at the radial exterior 1202 and/or radial interior 1204, respectively. In some implementations, the entrance of the S-shaped channels 1210 may be larger and/or smaller than the exit of the S-shaped channels 1210. In some implementations, the S-shaped channels 1210 can include rifling (e.g., spiraled grooves) and/or guide vanes formed within the S-shaped channels 1210. In some implementations, the S-shaped channels 1210 may be a single S-shape (e.g., one oscillation) or may have multiple oscillations. The amplitude of the S-shaped channels 1210 can vary upstream to downstream of the S-shaped channels 1210 (e.g., a larger amplitude upstream near the entrance and a smaller amplitude or straight channel downstream near the exit). In some implementations, the amplitude of the S-shaped channels 1210 may be constant. Because of the additional turns of S-shaped channels 1210, the radial catalyst or filter 1200 may have a higher backpressure than curved or straight channels, but may further improve flow uniformity into the radial catalyst or filter 1200 due to the higher backpressure. In addition, the curviness of the channels 1210 can increase catalyst performance benefits due to promotion of exhaust gas flow contact with the catalyst material on the curved channel walls.

Figure 13:
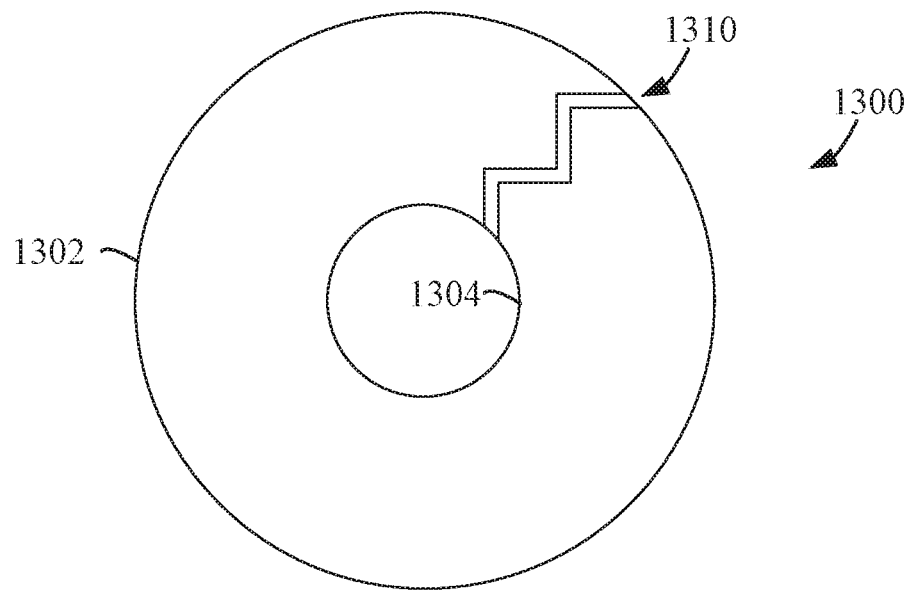
FIG. 13 is a schematic diagram showing a cross-sectional view of a radial catalyst having an example zig-zag channel from a radial exterior to a radial interior for exhaust gas to flow.

FIG. 13 depicts a cross-sectional view of an implementation of a radial catalyst or filter 1300 with a radial exterior 1302 and radial interior 1304 for a body, such as a substrate. The radial catalyst or filter 1300 includes one or more zig-zag channels 1310 formed through the body from the radial exterior 1302 to the radial interior 1304. In some implementations, an entrance and/or an exit of the zig-zag channels 1310 may be perpendicular to the surface at the radial exterior 1302 and/or radial interior 1304, respectively. In some implementations, the entrance and/or the exit of the zig-zag channels 1310 may form an angle (e.g., 0 degrees, inclusive, to 90 degrees, inclusive) relative to the surface at the radial exterior 1302 and/or radial interior 1304, respectively. In some implementations, the entrance of the zig-zag channels 1310 may be larger and/or smaller than the exit of the zig-zag channels 1310. In some implementations, the zig-zag channels 1310 can include rifling (e.g., spiraled grooves) and/or guide vanes formed within the zig-zag channels 1310. In some implementations, the zig-zag channels 1310 may be a single zig-zag (e.g., one oscillation) or may have multiple oscillations. The amplitude of the zig-zag channels 1310 can vary upstream to downstream of the zig-zag channels 1310 (e.g., a larger amplitude upstream near the entrance and a smaller amplitude or straight channel downstream near the exit). In some implementations, the amplitude of the zig-zag channels 1310 may be constant. Because of the additional turns of zig-zag channels 1310, the radial catalyst or filter 1300 may have a higher backpressure than curved or straight channels, but may further improve flow uniformity into the radial catalyst or filter 1300 due to the higher backpressure. In addition, the increased path length and oscillations of the channels 1310 can increase catalyst performance benefits due to promotion of exhaust gas flow contact with the catalyst material on the curved channel walls. In addition, the sharp changes in channel shape can promote locations for ash or other particulate matter deposits and result in improved ash or other particulate matter performance over channels of other smoother shapes. The sharper channels 1310 may also promote improved Particle Number (PN) performance.

Figure 14:
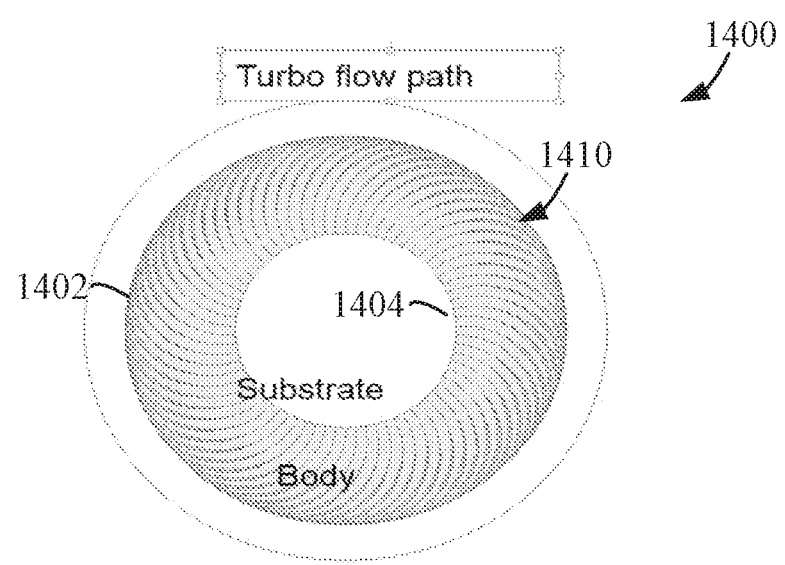
FIG. 14 is a schematic diagram showing a cross-sectional view of a radial catalyst having an example turbo flow path channel from a radial exterior to a radial interior for exhaust gas to flow.

FIG. 14 depicts a cross-sectional view of an implementation of a radial catalyst or filter 1400 with a radial exterior 1402 and radial interior 1404 for a body, such as a substrate. The radial catalyst or filter 1400 includes one or more turbo shaped channels 1410 formed through the body from the radial exterior 1402 to the radial interior 1404. In some implementations, an entrance and/or an exit of the turbo shaped channels 1410 may be perpendicular to the surface at the radial exterior 1402 and/or radial interior 1404, respectively. In some implementations, the entrance and/or the exit of the turbo shaped channels 1410 may form an angle (e.g., 0 degrees, inclusive, to 90 degrees, inclusive) relative to the surface at the radial exterior 1402 and/or radial interior 1404, respectively. In the implementation shown, the entrance of the turbo shaped channels 1410 is larger than the exit of the turbo shaped channels 1410 such that the exhaust gas entering the turbo shaped channels 1410 is compressed and accelerated through the turbo shaped channels 1410. In some implementations, the turbo shaped channels 1410 can include rifling (e.g., spiraled grooves) and/or guide vanes formed within the turbo shaped channels 1410. Turbo shaped channels 1410 can improve the introduction and/or exit of exhaust gas when the entry angle to the turbo shaped channels 1410 is substantially aligned with incoming flow and/or the exit angle to the turbo shaped channels 1410 is substantially aligned with a desired direction of outgoing flow. For catalyst implementations, the turbo shape of the turbo shaped channels 1410 can also improve catalyst performance due to increased channel wall contact between the exhaust gas flowing through the turbo shaped channels 1410 and the active material of the catalyst coating the walls of the turbo shaped channels 1410.

Figure 15:
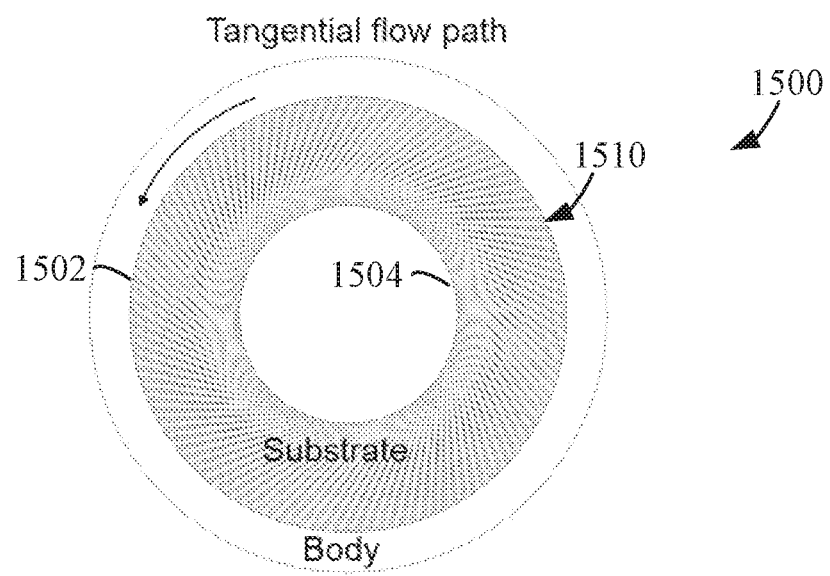
FIG. 15 is a schematic diagram showing a cross-sectional view of a radial catalyst having an example tangential channel from a radial exterior to a radial interior for exhaust gas to flow.

FIG. 15 depicts a cross-sectional view of an implementation of a radial catalyst or filter 1500 with a radial exterior 1502 and radial interior 1504 for a body, such as a substrate. The radial catalyst or filter 1500 includes one or more tangential channels 1510 formed through the body from the radial exterior 1502 to the radial interior 1504. In some implementations, an entrance and/or an exit of the tangential channels 1510 may be perpendicular to the surface at the radial exterior 1502 and/or radial interior 1504, respectively. In some implementations, the entrance and/or the exit of the tangential channels 1510 may form an angle (e.g., 0 degrees, inclusive, to 90 degrees, inclusive) relative to the surface at the radial exterior 1502 and/or radial interior 1504, respectively. In the implementation shown, the exit of the tangential channels 1510 is at an angle that is tangential to the radial interior 1504. In some implementations, the entrance of the tangential channels 1510 may be larger and/or smaller than the exit of the tangential channels 1510. In some implementations, the tangential channels 1510 can include rifling (e.g., spiraled grooves) and/or guide vanes formed within the tangential channels 1510. Tangential channels 1510 can improve the introduction and/or exit of exhaust gas when the entry angle to the tangential channels 1510 is substantially aligned with incoming flow and/or the exit angle to the tangential channels 1510 is substantially aligned with a desired direction of outgoing flow. For catalyst implementations, the tangential exit and/or entrance of the tangential channels 1510 can also improve catalyst performance due to increased channel wall contact between the exhaust gas flowing through the tangential channels 1510 and the active material of the catalyst coating the walls of the tangential channels 1510.

Figure 16:
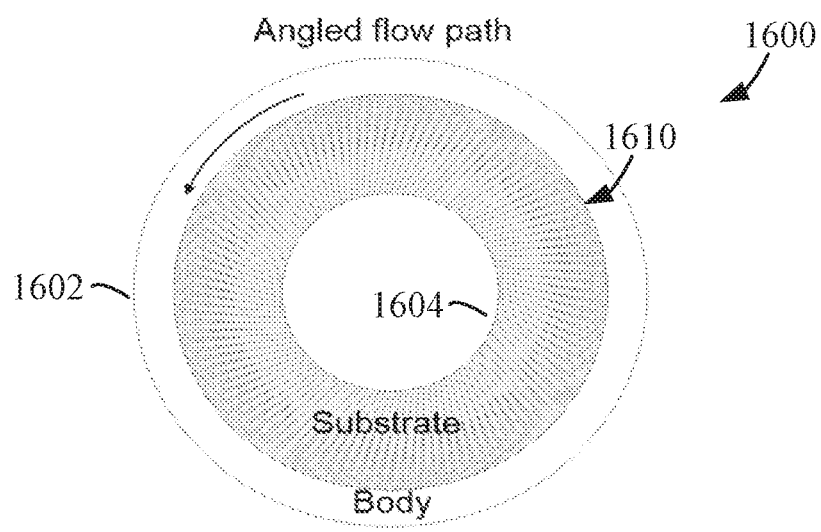
FIG. 16 is a schematic diagram showing a cross-sectional view of a radial catalyst having an example angled channel from a radial exterior to a radial interior for exhaust gas to flow.

FIG. 16 depicts a cross-sectional view of an implementation of a radial catalyst or filter 1600 with a radial exterior 1602 and radial interior 1604 for a body, such as a substrate. The radial catalyst or filter 1600 includes one or more angled or helical channels 1610 formed through the body from the radial exterior 1602 to the radial interior 1604. In some implementations, an entrance and/or an exit of the angled or helical channels 1610 may be perpendicular to the surface at the radial exterior 1602 and/or radial interior 1604, respectively. In some implementations, the entrance and/or the exit of the angled or helical channels 1610 may form an angle (e.g., 0 degrees, inclusive, to 90 degrees, inclusive) relative to the surface at the radial exterior 1602 and/or radial interior 1604, respectively. In some implementations, the entrance of the angled or helical channels 1610 may be larger and/or smaller than the exit of the angled or helical channels 1610. In some implementations, the angled or helical channels 1610 can include rifling (e.g., spiraled grooves) and/or guide vanes formed within the angled or helical channels 1610. Angled or helical channels 1610 can improve the introduction and/or exit of exhaust gas when the entry angle to the angled or helical channels 1610 is substantially aligned with incoming flow and/or the exit angle to the angled or helical channels 1610 is substantially aligned with a desired direction of outgoing flow. For catalyst implementations, the angled or helical shape of the angled or helical channels 1610 can also improve catalyst performance due to increased channel wall contact between the exhaust gas flowing through the angled or helical channels 1610 and the active material of the catalyst coating the walls of the angled or helical channels 1610.

Figure 17:
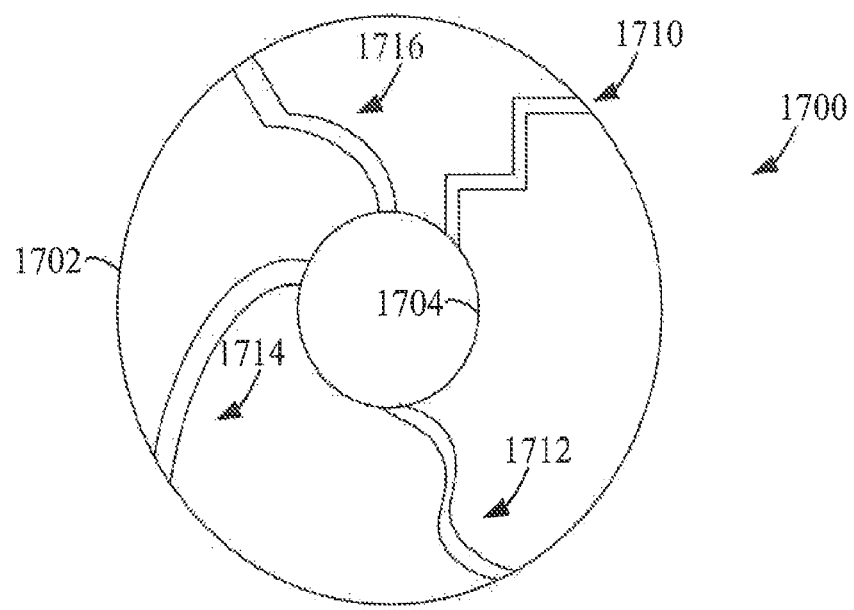
FIG. 17 is a schematic diagram showing a cross-sectional view of a radial catalyst having an example non-uniform channel from a radial exterior to a radial interior for exhaust gas to flow and several other channels, including a zig-zag channel, S-shaped channel, and a curved channel.

FIG. 17 depicts a cross-sectional view of an implementation of a radial catalyst or filter 1700 with a radial exterior 1702 and radial interior 1704 for a body, such as a substrate. The radial catalyst or filter 1700 includes one or more non-uniform channels 1716 formed through the body from the radial exterior 1702 to the radial interior 1704. The non-uniform channels 1716 can be a combination of one or more geometrical configurations along the length of the non-uniform channels 1716. In the implementation shown, the non-uniform channels 1716 include a straight first portion and a curved second portion. The first portion may be straight, curved, S-shaped, zig-zag, turbo shaped, tangential, angled, helical, or any other geometry. The second portion may be straight, curved, S-shaped, zig-zag, turbo shaped, tangential, angled, helical, or any other geometry. Additional portions (e.g., a third or further portions), may be included and may be straight, curved, S-shaped, zig-zag, turbo shaped, tangential, angled, helical, or any other geometry. The first portion may be selected based on a flow profile entering the radial catalyst or filter 1700 (e.g., straight for a straight flow entering the radial catalyst or filter 1700, curved for a curving flow entering the radial catalyst or filter 1700, etc.). The second portion may be selected based on a desired flow profile exiting the radial catalyst or filter 1700 (e.g., straight for a straight flow exiting the radial catalyst or filter 1700, curved for a curving flow exiting the radial catalyst or filter 1700, etc.). In other implementations, the first, second, or further portion of the non-uniform channels 1716 may be selected to increase backpressure, increasing contact between the exhaust gas and material coating the non-uniform channels 1716, etc. For instance, the non-uniform channels 1716 could include a straight first portion (e.g., based on a straight flow profile entering a respective non-uniform channel 1716), a zig-zag middle portion (e.g., to increase backpressure and contact between the exhaust gas and material coating the non-uniform channel 1716), and a curved second portion (e.g., based on a desired curved or swirling flow profile exiting the non-uniform channel 1716).

In some implementations, an entrance and/or an exit of the non-uniform channels 1716 may be perpendicular to the surface at the radial exterior 1702 and/or radial interior 1704, respectively. In some implementations, the entrance and/or the exit of the non-uniform channels 1716 may form an angle (e.g., 0 degrees, inclusive, to 90 degrees, inclusive) relative to the surface at the radial exterior 1702 and/or radial interior 1704, respectively. In some implementations, the entrance of the non-uniform channels 1716 may be larger and/or smaller than the exit of the non-uniform channels 1716. In some implementations, the non-uniform channels 1716 can include rifling (e.g., spiraled grooves) and/or guide vanes formed within the non-uniform channels 1716. Non-uniform channels 1716 can improve the introduction and/or exit of exhaust gas when the entry non-uniform channels 1716 are substantially aligned with incoming flow and/or the exit angle to the non-uniform channels 1716 is substantially aligned with a desired direction of outgoing flow. For catalyst implementations, the non-uniform channels can also improve catalyst performance due to increased channel wall contact between the exhaust gas flowing through the non-uniform channels 1716 and the active material of the catalyst coating the walls of the non-uniform channels 1716.

Still referring to FIG. 17, the radial catalyst or filter 1700 can include more than one type of channel, such as a zig-zag channel 1710, an S-shaped channel 1712, a curved channel 1714, and/or a non-uniform channel 1716. The geometry of the one or more channels of the radial catalyst or filter 1700 can be based on a desired performance for a corresponding sector of the radial catalyst or filter 1700, an exhaust gas flow profile entering and/or exiting the sector of the radial catalyst or filter 1700 and/or otherwise. For instance, a first half and/or first sector of the radial catalyst or filter 1700 may have curved channels 1714 based on a curved flow into the curved channels 1714 at the radial exterior 1702 and a desired curved or swirled flow exiting the curved channels 1714 at the radial interior 1704. A second half and/or second sector of the radial catalyst or filter 1700 may have non-uniform channels 1716 based on a straight flow into the non-uniform channels 1716 at the radial exterior 1702 and a desired curved or swirled flow exiting the non-uniform channels 1716 at the radial interior 1704. The channels for the first half, first sector, second half, second sector, and/or other sectors may be other geometries, including straight, curved, S-shaped, zig-zag, turbo shaped, tangential, angled, helical, or any other geometry.

Figure 18:
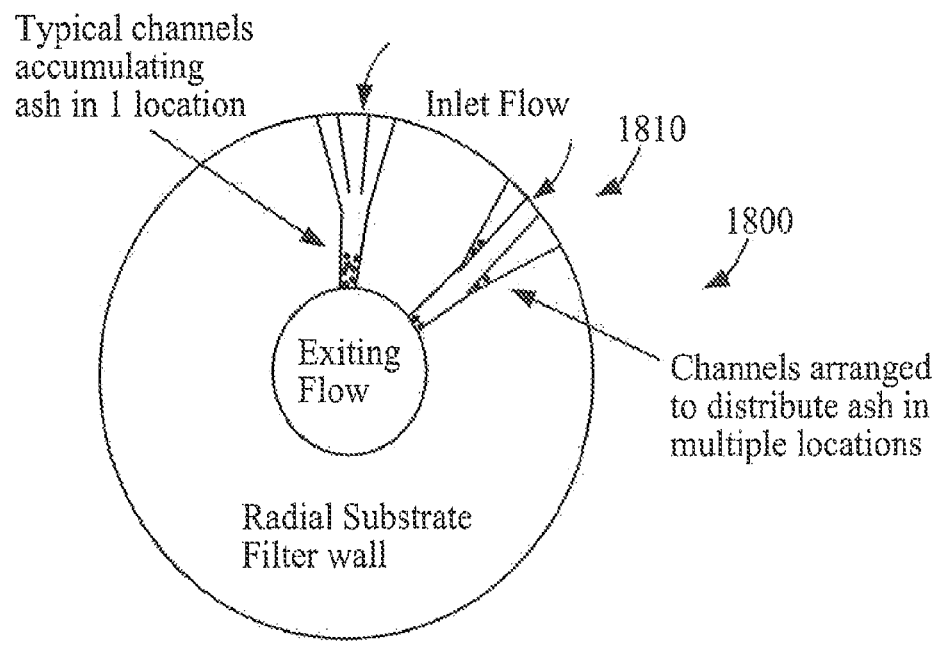

FIG. 18 depicts a cross-sectional view of a radial catalyst or filter 1800 having multiple intersection channels 1810 from a radial exterior to a radial interior for exhaust gas to flow through. The multiple intersection channel geometry is such that particulate matter, such as ash, is distributed over multiple locations or intersections rather than a single or only a few radial interior locations. As shown in FIG. 18, the multiple intersection channel geometry has multiple intersections located at different radial distances from the radial interior of the radial catalyst or filter 1800. In some implementations, the intersections can include a filter or other membrane or structure to trap particulate matter at the intersection. Thus, the multiple intersection channels 1810 have numerous "channel endings" formed by the intersections and the particulate matter accumulates at these multiple channel endings rather than a single ending or a few endings at the radial interior. This distributes the particulate matter across the filter or substrate volume rather than concentrating the particulate matter in one or a few locations at the radial interior. As particulate matter can be deposited at multiple intersections and locations, if a single intersection is clogged or has reduced flowthrough, the exhaust gas carrying particulate matter can be diverted to other unclogged or open intersections to keep exhaust gas flowing efficiently through the radial catalyst or filter 1800. Thus, the multiple intersection channels 1810 may reduce the backpressure resulting from the radial catalyst or filter 1800 as well as improve thermal robustness.

V. Example Variable Cell Density

Figure 19:
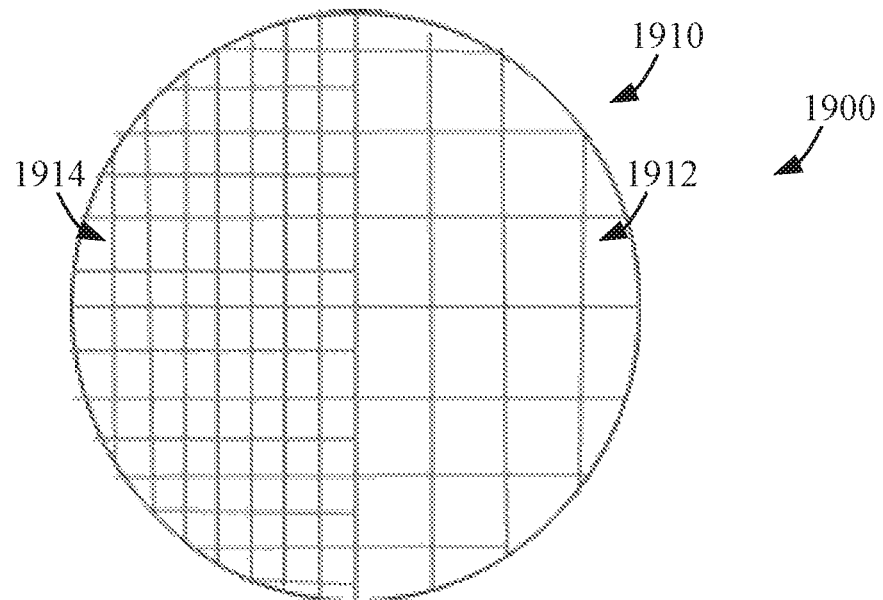
FIG. 19 is a front cross-sectional diagram of an example aftertreatment component having multiple longitudinal channel sizes.

FIG. 19 depicts an example catalyst or filter 1900 having a body 1910 with a variable channel size or cell density. In the example shown, the catalyst or filter 1900 is an axial catalyst or filter 1900 having a circular cross-section, though other geometries of the catalyst or filter 1900 and/or the cross-section may be implemented (e.g., square, rectangular, ovular, egg-shaped, etc.). The catalyst or filter 1900 includes a first portion 1912 and a second portion 1914. The first portion 1912 includes channels with a larger channel size (e.g., cross-sectional area) or lower cell density. The second portion 1914 includes channels with a smaller channel size (e.g., cross-sectional area) or higher cell density. In the example shown, the axial catalyst or filter 1900 has the first portion 1912 and second portion 1914 differing in the lateral direction, through the first portion 1912 and second portion 1914 could be arranged longitudinally within the catalyst or filter 1900. In further implementations, the first portion 1912 and second portion 1914 can vary in both the longitudinal and lateral directions. In still further implementations, the first portion 1912 and second portion 1914 can vary in the radial direction (e.g., the second portion in a radial interior and the first portion at the radial exterior). In yet further implementations, the first portion 1912 and second portion 1914 can have a random distribution or any other configuration. The configuration can be based on an upstream flow profile of exhaust gas entering the catalyst or filter 1900. The exhaust gas flows into an upstream face of the catalyst or filter 1900, into a plurality of channels in the first portion 1912 and second portion 1914, and out a downstream face of the catalyst or filter 1900.

Figure 20:
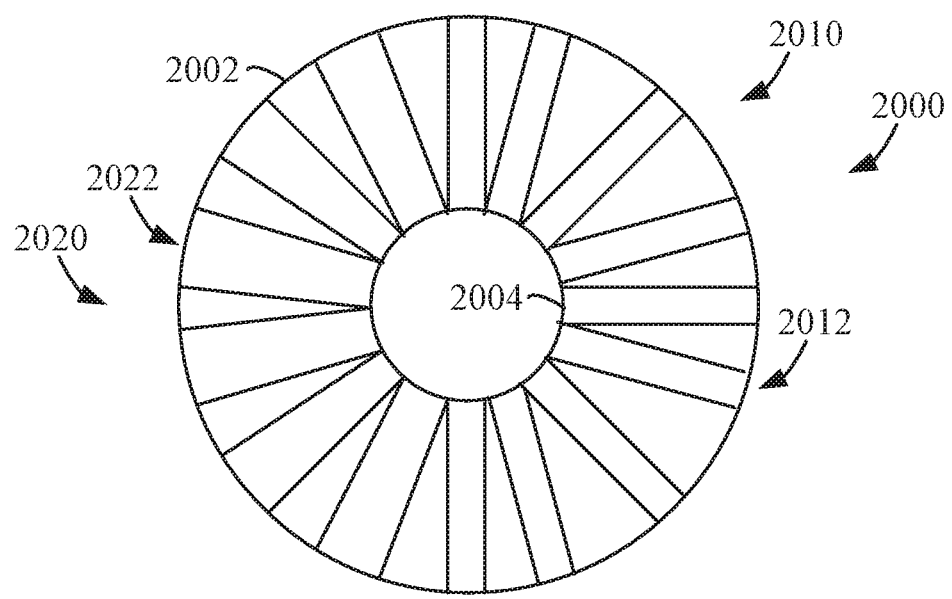
FIG. 20 is a top cross-sectional view diagram of a radial catalyst having multiple radial channel sizes from a radial exterior to a radial interior.

FIG. 20 depicts an example radial catalyst or filter 2000 having a body with a variable channel size or cell density. The radial catalyst or filter 2000 having a radial exterior 2002 and a radial interior 2004 with a plurality of channels 2012, 2022 extending from the radial exterior 2002 to the radial interior 2004. In the example shown, the catalyst or filter 2000 is a radial catalyst or filter 2000 having a circular cross-section, though other geometries of the catalyst or filter 2000 and/or the cross-section may be implemented (e.g., square, rectangular, ovular, egg-shaped, etc.). The catalyst or filter 2000 includes a first portion 2020 and a second portion 2010. The first portion 2020 includes channels 2022 with a larger channel size (e.g., cross-sectional area) or lower cell density. The second portion 2010 includes channels 2012 with a smaller channel size (e.g., cross-sectional area) or higher cell density. In the example shown, the radial catalyst or filter 2000 has the first portion 2020 and second portion 2010 differing in the lateral direction from one half to the other, through the first portion 2020 and second portion 2010 could be arranged axially within the catalyst or filter 2000. In further implementations, the first portion 2020 and second portion 2010 can vary in both the axial and lateral directions. In still further implementations, the first portion 2020 and second portion 2010 can vary in the radial direction (e.g., the second portion in a radial interior and the first portion at the radial exterior). In yet further implementations, the first portion 2020 and second portion 2010 can have a random distribution or any other configuration. The configuration can be based on an upstream flow profile of exhaust gas entering the catalyst or filter 2000. In some implementations, the exhaust gas flows into the radial exterior 2002 of the catalyst or filter 2000, into the channels 2012, 2022, and out the radial interior 2004 of the catalyst or filter 2000. In other implementations, the exhaust gas flows into the radial interior 2004 of the catalyst or filter 2000, into the channels 2012, 2022, and out the radial exterior 2002 of the catalyst or filter 2000.

Figure 21:
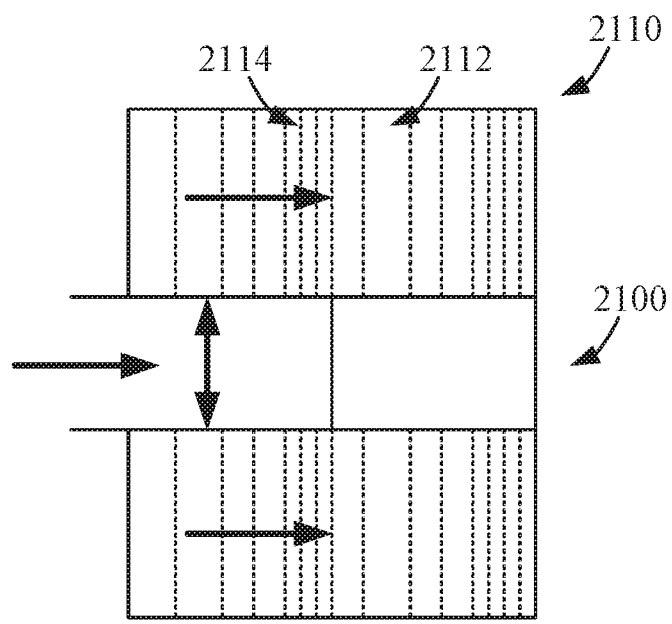
FIG. 21 is a top cross-sectional view diagram of a multi-axial filter having multiple axial channel sizes.

FIG. 21 depicts an implementation of a multi-axial filter 2100 having a body with a variable channel size or cell density. In the implementation shown, the exhaust gas enters an inlet of the multi-axial filter 2100 and is directed outwardly into filter portions 2110 having variable channel sizes or cell densities. In the implementation shown, an internal wall blocks flow through of the exhaust gas to direct the exhaust gas into channels 2112, 2114. In the implementation shown the multi-axial filter 2100 includes multiple portions with multiple channel sizes. A first portion includes channels 2114 with a larger channel size (e.g., cross-sectional area) or lower cell density. A second portion includes channels 2112 with a smaller channel size (e.g., cross-sectional area) or higher cell density. In the example shown, the multi-axial filter 2100 has the first portion and second portion differing in the longitudinal direction, through the first portion and second portion could be arranged laterally within the multi-axial filter 2100. In further implementations, the first portion and second portion can vary in both the longitudinal and lateral directions. In still further implementations, the first portion and second portion can vary in a radial direction (e.g., the second portion in a radial interior and the first portion at the radial exterior). In yet further implementations, the first portion and second portion can have a random distribution or any other configuration. The configuration can be based on an upstream flow profile of exhaust gas entering the multi-axial filter 2100. The foregoing configurations for the multi-axial filter 2100 may also be applied for a multi-axial catalyst.

Figure 22:
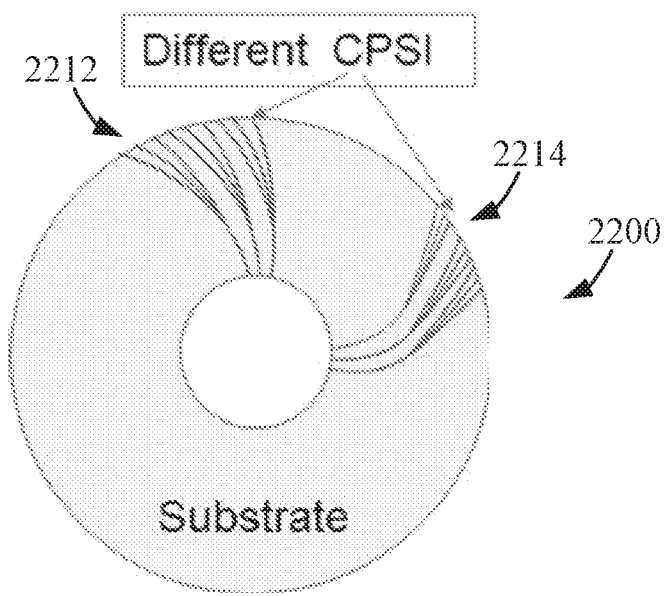
FIG. 22 is a top cross-sectional view diagram of a radial catalyst having multiple radial channel sizes from a radial exterior to a radial interior.

FIG. 22 depicts an example radial catalyst or filter 2200 having a body with a variable channel size or cell density. In the implementation shown, the catalyst or filter 2200 includes a first portion and a second portion. The first portion includes channels 2212 with a larger channel size (e.g., cross-sectional area) or lower cell density. The second portion includes channels 2214 with a smaller channel size (e.g., cross-sectional area) or higher cell density. In the example shown, the radial catalyst or filter 2200 has the first portion and second portion differing at different angular locations (e.g., a first angular location for the first portion with the channels 2212 and a second angular location for the second portion with the channels 2214), through the first portion and second portion could be arranged axially within the catalyst or filter 2200. In further implementations, the first portion and second portion can vary in both the axial and angular directions. In still further implementations, the first portion and second portion can vary in the radial direction (e.g., the second portion in a radial interior and the first portion at the radial exterior). In yet further implementations, the first portion and second portion can have a random distribution or any other configuration. The configuration can be based on an upstream flow profile of exhaust gas entering the catalyst or filter 2200. In some implementations, the exhaust gas flows into the radial exterior of the catalyst or filter 2200, into the channels 2212, 2214, and out the radial interior of the catalyst or filter 2200. In other implementations, the exhaust gas flows into the radial interior of the catalyst or filter 2200, into the channels 2212, 2214, and out the radial exterior of the catalyst or filter 2200.

Figure 23:
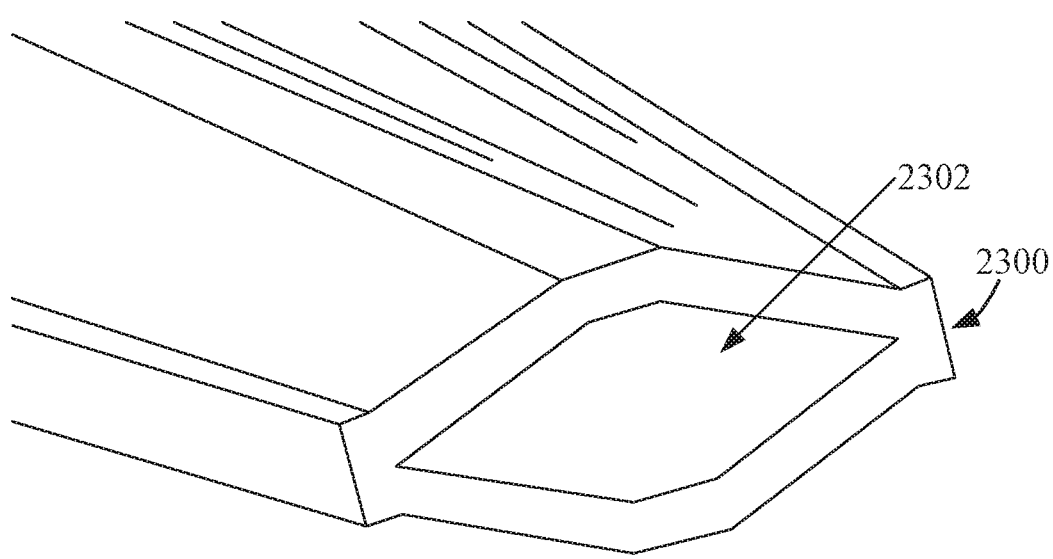
FIG. 23 depicts a perspective view of a channel showing a cross-sectional area as an effective channel size.

FIG. 23 depicts an example channel 2300 that may be formed in a substrate for a catalyst or filter. The channel 2300 shows a cross-sectional area 2302 that may be considered as the effective channel size. The channel 2300 can include one or more sidewalls defining the channel and the cross-sectional area 2302 for the effective channel size. In other implementations, the volume within the channel 2300 may be the effective channel size.

As described in example implementations, in order to manage the local and bulk air flow entering a catalyst substrate or filter and thus improve aftertreatment performance, the effective channel size or CPSI can be changed in the various locations of the catalyst or filter. This can be applied to catalyst substrates or filters of various flow arrangements such as radial, axial or multi-axis flow arrangements. These substrate or filter arrangements could utilize separate plates to arrange the varying CPSI or the substrate or filter could be manufactured as a monolith of varying CPSI. The use of varying CPSI in a substrate or filter assembly can be used to manage airflow and distribute the airflow uniformly into the catalyst substrate or filter channels. Areas of high CPSI will have higher resistance (i.e., backpressure) to incoming flow and thus can direct airflow to other areas or channels of the catalyst substrate or filter to drive the flow to be uniform at essentially all entering locations of the catalyst substrate or filter. This arrangement allows distribution devices that are external to the catalyst or filter to not be needed, thus saving space and cost. Getting the flow to uniformly enter a catalyst can result in increased catalyst efficiency, such as improved NOR, ammonia, or hydrocarbon conversion, resulting in the use of less catalyst volume, thereby improving aftertreatment size and cost. Similarly, getting the flow to uniformly enter a filter can result in increased filter efficiency, such as improved soot, ash, or other particulate matter entrapment and/or improved filter area utilization, resulting in the use of less filter volume, thereby improving aftertreatment size and cost.

Any of the foregoing configurations in FIGS. 2-23 may be combined with any of the other configurations of FIGS. 2-23. In addition, while some implementations are described in relation to an axial, radial, and/or or multi-axial catalyst or filter, the configuration may be applied to other axial, radial, and/or or multi-axial catalysts or filters. The configurations of FIGS. 2-23 may be implemented into an aftertreatment system such as that described in FIG. 1.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A radial aftertreatment component comprising:
    a substrate having a radial exterior surface, and a radial interior surface defining a central axial inlet or outlet, the substrate including a channel formed therethrough from a first end at the radial exterior surface to a second end at the radial interior surface,
    wherein, in a cross-section of the substrate, the second end of the channel is tangential to the radial interior surface.

2. The radial aftertreatment component of claim 1, wherein the substrate is a substrate for a filter or a catalyst.

3. The radial aftertreatment component of claim 1 further comprising an upstream end coupled to an aftertreatment system.

4. The radial aftertreatment component of claim 1 further comprising a downstream end coupled to an aftertreatment system.

5. The radial aftertreatment component of claim 1, wherein the first end of the channel is perpendicular to the radial exterior surface.

6. The radial aftertreatment component of claim 1, wherein the first end of the channel is oblique to the radial exterior surface.

7. The radial aftertreatment component of claim 1, wherein the first end of the channel is larger than the second end of the channel.

8. The radial aftertreatment component of claim 1, wherein the channel includes grooves or vanes.

9. The radial aftertreatment component of claim 1, wherein at least a portion of the channel is curved.

10. A radial aftertreatment component comprising:

a substrate having a radial exterior surface, and a radial interior surface defining a central axial inlet or outlet, the substrate including a channel formed therethrough from a first end at the radial exterior surface to a second end at the radial interior surface, wherein, in a cross-section of the substrate, the channel has an S-shape.

11. A radial aftertreatment component comprising:

a substrate having a radial exterior surface, and a radial interior surface defining a central axial inlet or outlet, the substrate including a channel formed therethrough from a first end at the radial exterior surface to a second end at the radial interior surface, wherein the channel has a shape having at least a portion that is angled in a cross-section of the substrate, and wherein the channel comprises a first end and a second end opposite the first end, wherein the first end is larger than the second end.

\* \* \* \* \*